Aug. 13, 1935.  E. W. SMITH  2,010,968
DIRECTION AND DISTANCE MEASUREMENT
Filed Aug. 3, 1933
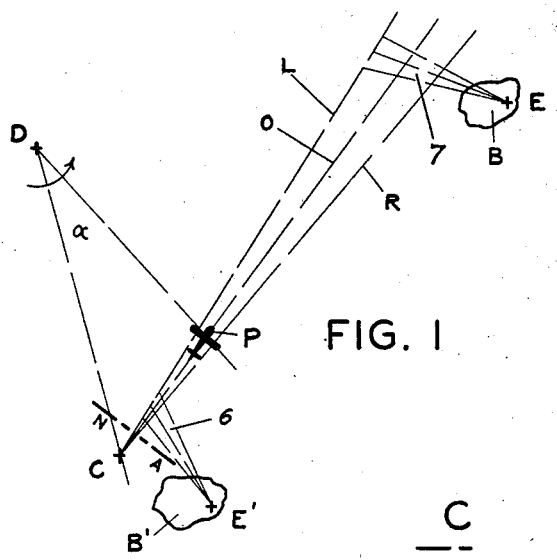
FIG. 1
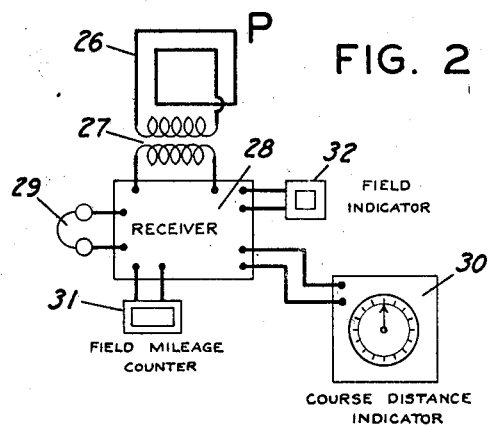
FIG. 2
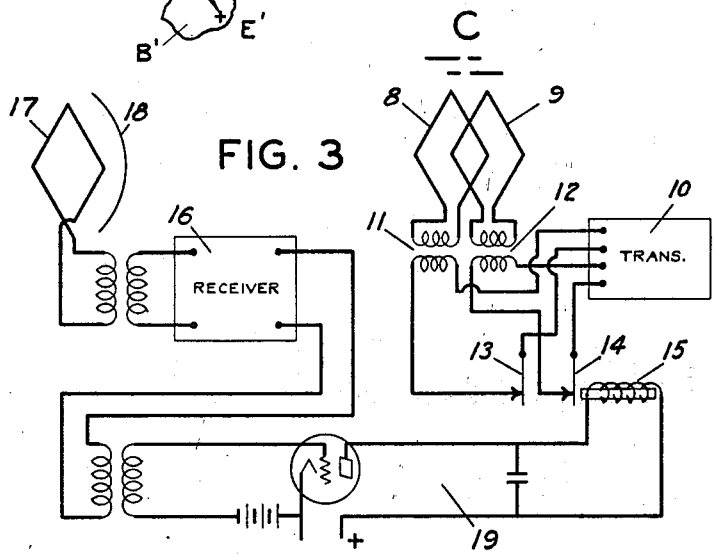
FIG. 3
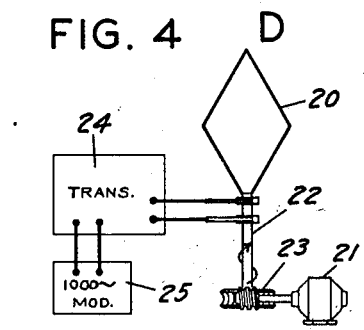
FIG. 4
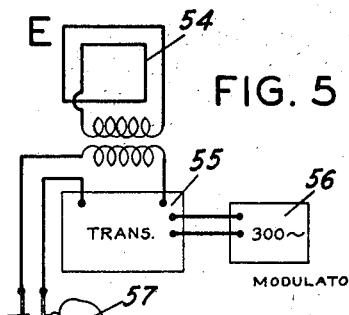
FIG. 5
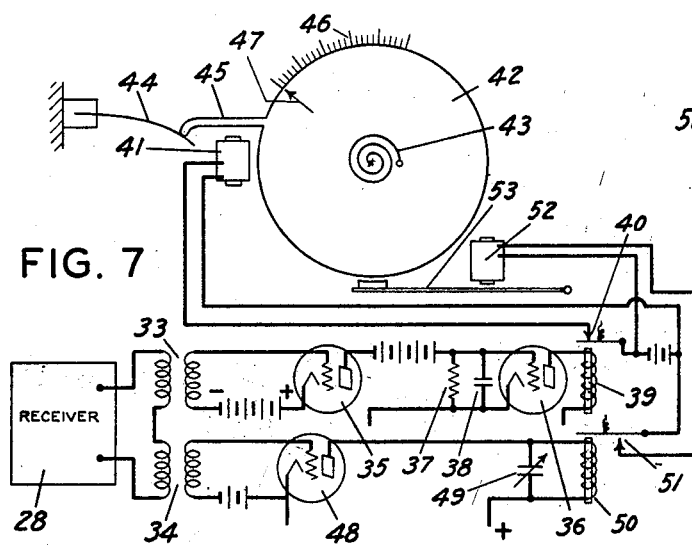
FIG. 7
FIG. 6
INVENTOR
EDWARD W. SMITH
BY
ATTORNEY Patented Aug. 13, 1935

2,010,968

UNITED STATES PATENT OFFICE 2,010,968

DIRECTION AND DISTANCE MEASUREMENT

Edward W. Smith, Melrose, Mass., assignor to Submarine Signal Company, Boston, Mass., a corporation of Maine.

Application August 3, 1933, Serial No. 683,420

8 Claims. (Cl. 250—11)

The present invention relates to course indications, particularly to guide crafts between two stations without the use of any of the nautical methods of measurement for finding the position or measuring distance, etc.

The present invention is more particularly applicable to indicating courses of aircrafts between two landing fields, but it may also be applied to the indication of courses between two ports for marine crafts, vessels, or the like.

The present invention more particularly relates to methods in which electromagnetic waves are employed. These may be directive or they may be transmitted in such a manner that a directive pattern results. A common means which has been employed in the prior art is to send out an electromagnetic wave in such a way that along the line of the course a series of dashes will be continually produced whereas to one side of the course a signal of a dot and dash may be given and on the other side of the course a signal comprising a dash and a dot might be given. This particular type of electromagnetic course indicator has commonly been designated as an interlocking signal, the operator knowing that he is on the course when he hears only the continued series of dashes and to one side or the other side of the course depending upon whether the signal he hears is the code letter N or the code letter A. The usual way in which this signal is indicated is simply by a pair of phones which the operator places on his ears so that no other apparatus is needed except the ordinary radio receiver.

This type of electromagnet course indicator is usually established by transmitting stations somewhere in the vicinity of an airport and directed to the next airport to which the course runs. These so-called radio beacons are established at sufficiently near intervals from one other to produce a continuous course indication from one landing port to the next. Unfortunately on account of the fact that radio masts of considerable size are used, it has been the custom to have these transmitting stations a few miles from the airport itself so that there is no possibility of the plane colliding with the beacon in making the landing field. While, therefore, it is quite evident that after the aircraft has once found the course, there is little diffculty in maintaining the proper course. However, it frequently happens that there may be considerable difficulty in locating the beacon and in getting on the beacon course. Likewise, it is also true that considerable difficulty has been encountered in knowing when to turn from the beacon to reach the airport on which the pilot wishes to land.

It is one of the objects of the present invention to overcome the difficulties both in finding the radio beacon after the pilot has taken off with his craft from the field and also in determining when to leave the beacon in order to make the desired landing field. It is a further object of the present invention to give the pilot an indication of how far he has progressed along his course and also to indicate the distance that he has travelled in leaving the course for the landing field.

It is further possible by the present invention to obtain an indication of how far the craft has travelled from the landing field before intersecting the radio beacon.

The present invention makes use of the well-known radio beacon, mentioned above, in which a continuous dash is produced in the radio receiver upon the plane when the pilot is on the course and in which different signals, preferably the code letters N and A, are produced when the pilot is on one or the other side of the course. While the applicant prefers to use this type of radio beacon in connection with his invention, it should be noted that any type of beacon may be used which will provide a course indication extending between airports.

Further objects and advantages of the present invention will be understood from the description of the embodiment of the invention given below in connection with the drawing in which Fig. 1 shows schematically the two fields and the layout of the transmitting and receiving system on the aircraft and on the ground; Fig. 2 shows schematically the apparatus located upon the plane; Fig. 3 shows schematically the apparatus at the beacon station C in Fig. 1; Fig. 4 shows schematically the auxiliary transmitter located at D in Fig. 1; Fig. 5 shows the apparatus located at E and E' in Fig. 1; Fig. 6 shows a detail of the field mileage counter indicated in Fig. 2; and Fig. 7 illustrates the course distance indicator also shown in Fig. 2.

In Fig. 1 one landing field is indicated as B', a second landing field as B. A radio beacon C of the type described above is provided near one landing field for directing crafts towards the other landing field. The center line of this beacon may be indicated at O where a signal of continuous dash is produced, the area between O and L where an N signal is produced and the area between O and R where an A signal is produced. The craft P is assumed to be upon the correct course, having gained the course by following the center line 6 from the small radio beacon E' on the landing field B'. If it is desired to direct the craft P to the landing field E, it will proceed along the course O until it comes to the cross beacon 7 whereupon it will turn off to the right and will follow the cross beacon 7 to the landing field B. The cross beacon 7 is similarly established as the cross beacon 6 by means of the small field beacon E.

In addition to the apparatus which has been described there is provided a rotating beacon at a point between the two fields. This beacon provides a directive beam which sweeps over the beacon produced from the transmitter C. The function and operation of each of these beacons will be described in detail in accordance with the other figures in the drawing.

The transmitting beacon at the station C is indicated as having a double aerial 8 and 9 one of which transmits the signal N, the other transmitting the signal A. Both aerials 8 and 9 being directive and their signals interlocking, a continuous series of dashes is produced along the course beacon itself. A transmitter 10 is provided coupled with the aerials 8 and 9, respectively, through the transformers 11 and 12. Each of the circuits operating the antennæ 8 and 9 is controlled by the relay contacts 13 and 14 operable through a relay magnet 15, its purpose being to interrupt the beacon signals at certain definite and given intervals. These beacon signals, as indicated in the figure, are interrupted through the radio receiver 16 operated by the receiving antenna 17 which may be located at or near the transmitter C. If it is located near the transmitter C, it may be shielded therefrom by a shield 18. The antenna 17 is designed especially to pick up the signal transmitted from the rotating beam transmitter D. The signal picked up by the antenna 17 is impressed upon the receiver 16 which in turn operates the relay circuit 19 for controlling the relay 15, interrupting the course beacon C. The course beacon C operates continuously except when interrupted by the signal picked up from the rotating beacon D. The rotating beacon D is illustrated in Fig. 4 and may comprise a directional antenna 20 which is revolving continuously at a known speed to produce a rotating beam.

The rotation of the beacon 20 may be effected by means of the motor 21 which drives the shaft 22 on which the antenna is supported through the reduction gear 23. The antenna 20 may be excited through the transmitter 24 and may be provided with a characteristic signal through the modulator 25 which preferably modulates the signal at an audio frequency of a definite magnitude. In the present case a note of 1000 cycles has been chosen, but this may be varied within any reasonable range so as to produce a characteristic signal emitted from the rotating beacon 20.

On the aircraft P there is provided a receiving antenna 26 which is coupled through the transformer coil 27 to the radio receiver 28 which may be of the ordinary type and which may include the necessary amplifier to operate the auxiliary apparatus associated with the receiver. For listening to the signals of the transmitting station C a pair of phones 29 may be provided or a loud speaker or any other suitable device. For indicating the distance from the course station C, course distance indicator 30 is provided which will be described presently.

The other equipment associated with the receiver 28 is the field mileage counter 31 and the field indicator 32. The course indicator is shown more in detail in Fig. 7. In this device the interruption of the course signal from the station C commences the operation of the distance-measuring element while the receipt of the direct signal from the rotating beacon D as the beacon sweeps by the position of the plane stops the time-measuring element.

The distance that the element has travelled between these two intervals indicates the position of the element on its course since the only quantity unknown in the triangle DCP in Fig. 1 is the angle DPC and the distance DP. In Fig. 7 the receiver 28 which is the same receiver as that shown in Fig. 2 transmits continuously through the coupling coils 33 and 34 both the course signal and the signal from the station D. The course signal is transmitted through the circuit 35 which is similar to the circuit in the application of Edwn E. Turner, Jr., Serial No. 270,660, filed April 17, 1928, in that the signal cuts off the plate current flowing in the tube 36 and the circuit is not restored to normal immediately because of the time-delay element furnished through the combination of the resistance 37 and the capacity 38. This time-delay element is so adjusted that a longer silent interval than that provided between the dashes or dots of the course signal is needed to build up plate current in the tube 36. Therefore, with the course signal being continuously received, the current passing through the relay coil 39 remains zero and the relay contacts 40 remain closed. When the course signal is interrupted through the action of the relay coil 15, shown in Fig. 3, the relay contacts 14 are opened and thereby the electromagnet 41 becomes deenergized starting the timing device. The timing device in this case may comprise a balanced disc 42 with a retraction spring 43, the disc being adapted to move substantially uniformly during the time measurement. The disc receives a single initial impulse through the spring 44 against which the disc is held by the magnet 41 through the arm 45.

A scale 46 may be provided opposite the indicator 47 and this scale may be calibrated directly in distances corresponding to the velocity of rotation of the beacon. When the beacon D has come in such a position during its rotation that the beam is directed towards the plane P, the receiver 28 will pick up this beacon signal which may be a straight carrier-wave signal modulated at a definite frequency, in the present case 1000 cycles being chosen. This signal is transmitted through the coil 34 to the selector circuit 48 which passes only the modulated note received by any of the well-known means.

In the present case there is indicated a tuned circuit comprising the condenser 49 and the relay coil 50, but any other suitable means may be chosen. When the signal is received and transmitted to the coil 50, it operates to close the circuit of the contacts 51, thereby energizing the magnet 52 and operating the brake element 53 for stopping the movement of the disc 42. The relay 51 is preferably of such a nature that it closes quickly but opens slowly so that the measurement produced by the stopping of the disc 42 persists for some time. Any one of the commonly known means may be used for this purpose, such, for instance, as the ordinary time-delay relay in which a damping element is provided to open the contacts only at a definite time interval.

The beacons 6 and 7 may be produced by the transmitters shown in Fig. 5 which comprises a small directive sending antenna 54 which is fixed in a position on the field and is of such a size that it will not affect the landing or taking off of the planes from the field. A small loop of a few square feet in area may be used for this purpose since the range required for transmission is only a few miles. A transmitter for the loop 54 is indicated at 55. The beam transmitted by the antenna 54 is preferably modulated at a definite frequency to produce a distinctive note to the field signal. The modulator is preferably chosen at about 300 cycles and is indicated to the right of the transmitter as 56 in Fig. 5. The transmitter is operated periodically by the cam 57 which may be rotated by a small motor or a clock mechanism at a constant speed, the cam 57 operating the contact 58 for closing periodically at definite intervals the transmitter circuit for emitting the directed signal. This signal is audible in the telephone 29 on the plane and further through a proper amplifier in the receiver is made to operate the field mileage counter indicated at 31.

Schematic details of the counter are indicated in Fig. 6. Each signal individually operates the electromagnet 59 which draws to it the pivoted armature 60 advancing the sprocket 61 one tooth for each motion of the armature 60, the finger 62 being pivoted to the armature 60 for catching into the sprocket 61 for operating the same. A pole 63 may be provided for preventing the sprocket 61 from slipping back while the finger 62 and the armature 60 resume their normal position. When the plane turns into the cross beacon 7, the signal of the station E or E' begins to operate the field mileage counter and automatically the pilot is given an indication of how long a time and how great a distance he has travelled since he reached the cross beam from the field. The mileage counter on each plane may be adjusted for the average travelling speed of the plane to indicate the approximate miles that the plane is travelling, or it may be adjusted simply to indicate the length of time that the aircraft has been in the cross beam.

In the operation of the system the pilot may take off from the field and follow the cross beam to the course beam, the mileage counter indicating the approximate distance he has travelled on the crossbeam. When the pilot reaches the course beam he immediately begins to get readings of his course distance due to the operation of the course-distance indicator periodically through the interruption of the course signal and the receipt of the signal from the rotating beacon at D.

The rotating beacon at D is positioned to sweep the entire course between two landing points or it may be so placed to sweep the course between any two given points, a second rotating beacon being provided to sweep the course between two following points. Each rotating beacon, in case there is more than one, may be provided with different distinctive signals so that the operator will know at which point in the course he is computing the distance from.

It may be remarked that the amplifying circuit in the receiver for operating the field mileage counter is selectively tuned so that the course signal will not operate the electromagnet 59. This may be obtained in the manner similar to that described above in connection with the operation of the course distance indicator from the rotating beacon D.

Having now described my invention, I claim:

1. A system for course and distance measurement comprising means for transmitting a directed beam of signal energy substantially along the course from one landing spot to the next, means for transmitting a rotating beam, means operative by said rotating beam for varying the operation of the directed beam when the rotating beam has assumed a definite position, and means located on the craft for receiving the directed beam and the rotating beam and thereby providing a measurement of distance on the course.

2. A method of measuring distance of a craft from a station when traveling on a known course laid out by a directed beam of radiant energy which consists in rotating an emitted beam of radiant energy, causing the rotated beam of radiant energy to vary in a given position the operation of the directed beam, receiving on the craft the variation in the directed beam and a signal of the rotated beam when that is directed at the craft and measuring by the time interval between the two signals the distance.

3. A system for course and distance measurement comprising means for transmitting a directed beam of signal energy substantially along the course from one landing spot to the next where a craft is traveling, means for transmitting a rotating beam sweeping over the course, means for producing a signal when the rotating beam has assumed a definite position with respect to the course, means for receiving said signal on the craft and the signal when the rotating beam sweeps the craft and means for indicating the distance operative through the receipt of the two signals.

4. A system for course and distance measurement comprising means for transmitting a directed beam of signal energy substantially along the course from one landing spot to the next where a craft is traveling, means for transmitting a rotating beam sweeping over the course, means for producing a signal when the rotating beam has assumed a definite position with respect to the course, a time-measuring device located on the craft, means positioned on the shaft operative by the signal to commence the operation of the time-measuring device and means affected by the receipt of the rotating beam upon the craft to stop the operation of the measuring device indicating a measurement.

5. In a system for course and distance measurement, a time-measuring device positioned on a craft, a radio receiver, means operative by said receiver to commence the operation of the measuring device at a time of interruption in the operation of the radio receiver and means operative by said receiver to stop the operation of the measuring device upon receipt of a special signal.

6. In a system for course and distance measurement, in combination, a radio receiving device, an electron tube circuit connected therewith for providing a continuous flow of current with a code signal operating the receiver, a timing means, electromagnetic means operated by said receiver for controlling the operating of said timing means, a second electron tube circuit operated by said receiver and means operated thereby for stopping the operation of the timing means.

7. In a system for course and distance measurement, in combination, a radio receiving device, a time measuring device including a timing disc held initially in a tensioned position by electromagnetic means, means operatively associating said electromagnetic means with said receiving device for releasing said timing disc by interruption in the operation of said receiving device, and means for marking the end of the time interval to be measured.

8. In a system for course and distance measurement, in combination, a radio receiving device, an electron tube circuit connected therewith for providing a continuous flow of current with a code signal operating the receiver, a timing means, electromagnetic means operated by said receiver for controlling the operating of said timing means, a second electron tube circuit operated by said receiver and means operated thereby for indicating the end of the time interval measured.

EDWARD W. SMITH.